(12) United States Patent
Trivett et al.

(10) Patent No.: US 6,402,816 B1
(45) Date of Patent: Jun. 11, 2002

(54) GAS SCRUBBER

(76) Inventors: Gordon S. Trivett, 2359 Evanshire Crescent, Nanoose Bay (CA), V9P 9G6; D. Andrew Trivett, Kedy's Landing Edgewater Street, Mahone Bay (CA), B0J 2E0

(*) Notice: Subject to any disclaimer, the term of this patent is extended or adjusted under 35 U.S.C. 154(b) by 0 days.

(21) Appl. No.: 09/544,978

(22) Filed: Apr. 7, 2000

Related U.S. Application Data

(63) Continuation of application No. PCT/CA98/00949, filed on Oct. 7, 1998.
(60) Provisional application No. 60/062,654, filed on Oct. 8, 1997.

(51) Int. Cl.[7] ............................................. B01D 47/02
(52) U.S. Cl. ........................... 95/226; 96/279; 96/344; 96/353
(58) Field of Search .............................. 95/226; 96/329, 96/340, 341, 342, 343, 344, 345, 335, 336, 346, 347, 278, 279, 351, 352, 353, 354

(56) References Cited

U.S. PATENT DOCUMENTS

| | | | |
|---|---|---|---|
| 1,290,961 A | * | 1/1919 | Frank |
| 1,940,034 A | * | 12/1933 | Wallace |
| 2,004,467 A | * | 6/1935 | Hawley |
| 2,405,494 A | * | 8/1946 | Dupuy |
| 3,581,474 A | | 6/1971 | Kent |
| 3,620,510 A | | 11/1971 | Longcore |
| 3,640,513 A | | 2/1972 | Bowie |
| 3,693,433 A | | 9/1972 | Kobori et al. |
| 3,756,580 A | * | 9/1973 | Dunn |
| 3,994,705 A | * | 11/1976 | Przewalski |
| 4,041,759 A | | 8/1977 | Palmer et al. |
| 4,051,725 A | | 10/1977 | Schloss |
| 4,081,269 A | | 3/1978 | Nomine et al. |
| 4,091,075 A | | 5/1978 | Pessel |
| 4,174,630 A | | 11/1979 | Nicoli |

(List continued on next page.)

FOREIGN PATENT DOCUMENTS

| | | | |
|---|---|---|---|
| CH | 629972 | * | 5/1982 |

*Primary Examiner*—Duane S. Smith
(74) *Attorney, Agent, or Firm*—Kenneth L. Bousfield

(57) ABSTRACT

An exhaust gas scrubber including a tank of scrubbing liquid into which a downconer pipe(s) feeds inlet gas and fresh scrubbing liquid from a plenum. The inlet gas flows through slotted vortex generators forming file-scale bubbles encapsulated within a scrubbing liquid. The bubbles mix and coalesce in a turbulent motion, and are then passed through another set of vortex generators which break up coalesced bubbles and form fresh fine sized bubbles, and impart an angular velocity to the mixture. Formation and coalescence of the bubbles produce gas phase to liquid phase mixing and scrubbing. Centrifugal forces created through the slotted vortex generator produce liquid circulation and recycle. The bubbly mixture then rises, bubbles coalesce and break, and the liquid scrubbing solution falls back, flowing into a relatively quiescent down flow zone around the perimeter of the scrubber outside of an overflow weir or weirs. The outlet gas rises into a freeboard section where de-mister and heat exchanger pipes remove scrubbing vapour from the outlet gas. The scrubbing liquid flows downward into a quiescent settling tank where honeycomb vortex breakers inhibit turbulence to ensure settling of particulate into the sediment. Internal solids separation is accomplished in quiescent zones between the outer walls of the overflow dam(s) and the inner walls of the housing, and below the honeycomb vortex inhibitors. A conical bottom to the tank permits the settling sediment to be flushed out of the scrubber with the outlet scrubbing liquid. Scrubber solution so liquid level is controlled by a flow and level control valving arrangement. Scrubber solution temperature is controlled by a complementary arrangement of flow controls.

24 Claims, 11 Drawing Sheets

U.S. PATENT DOCUMENTS

| | | |
|---|---|---|
| 4,207,290 A | 6/1980 | Lee |
| 4,235,609 A * | 11/1980 | Garigioli |
| 4,300,924 A * | 11/1981 | Coyle |
| 4,368,060 A * | 1/1983 | Yamagiaki et al. |
| 4,631,958 A | 12/1986 | Van Cauwenberghe |
| 4,631,959 A | 12/1986 | Motycka |
| 4,671,108 A | 6/1987 | Vonnegut |
| 4,846,856 A | 7/1989 | Burger et al. |
| 4,859,440 A | 8/1989 | Zechner et al. |
| 4,890,488 A | 1/1990 | Pincent et al. |
| 4,926,764 A | 5/1990 | Van den broek |
| 5,038,610 A | 8/1991 | Diehl et al. |
| 5,100,442 A | 3/1992 | Gore et al. |
| 5,209,766 A | 5/1993 | Reither |
| 5,468,270 A | 11/1995 | Borszynski |
| 5,520,714 A * | 5/1996 | Muschelknautz |
| 5,773,621 A * | 6/1998 | Nisino et al. |

* cited by examiner

GAS SCRUBBER

This application is a continuation of PCT/CA98/00949 filed Oct. 7, 1998, and claims the benefit of Provisional No. 60/062,654 filed Oct. 8, 1997.

FIELD OF THE INVENTION

This invention relates to a scrubber apparatus that employs equipment for generating streams of bubbles to mix with a liquid or liquid-like medium by which means undesirable elements can be removed or changed to a more benign form. In a specific, non-limiting example of an application for which the invention is suited, the scrubber can be used to remove particulate from the exhaust gases of an internal combustion engine.

BACKGROUND OF THE INVENTION

In light of environmental concerns, in recent times there has been a greater emphasis on the reduction of pollutants emitted in smoke plumes, whether of factories, electricity generating stations, vehicles or ships. Similarly there has also been an emphasis on the removal, or conversion, of toxic chemicals emitted from industrial processes, whether in the pulp and paper, plastics, or other industries. There has also been a desire to reduce the heat emitted by engine exhaust systems, whether for the purpose of achieving greater economies by trapping and re-using waste heat for secondary and tertiary activities or for reducing the infra-red heat signature of an engine intended for military use. Further, a scrubber may, as one of its features, not only remove undesired elements, but may also reduce the noise of an exhaust flow.

There are many examples of specific instances when scrubbing is desirable. For example it may be desired to remove gaseous and fine particulate matter contaminants, odorous compounds and other undesirable elements from exhaust gases emanating from combustion of fossil fuels, whether gas, fuel oil, diesel oil and other petroleum products. The fuels are commonly used in marine diesel engines and boilers, diesel engines used for transportation and construction equipment, whether for highway vehicle use, forestry equipment, mining, or other purposes. In some instances use of a water scrubbing medium is also desired to discourage or eliminate spark emission.

In another field, it is desirable to scrub exhaust gases emanating from industrial processes such as chemical processes, heat transfer processes, food preparation, agricultural operations, mechanical parts cleaning, paint spray operations and similar processes. Similarly, it may be desired to treat products of the combustion of solid, liquid and gaseous fuels such as biomass, coal, coal water slurry, coal and limestone water slurry, coal methanol slurry. Further still, scrubbing may be required for products of combustion from incineration systems for the thermal destruction of solid, liquid or gaseous waste products. These can include industrial and municipal wastes, biomedical wastes, hazardous and pathological solid and liquid wastes, and solids and liquids contaminated with toxic, hazardous, and pathological wastes, accidental hazardous and dangerous waste spills, and similar waste products.

In another application, it may be desired to inject air and other gases into liquid chemical or liquid biomass, or liquid chemical and liquid biomass solutions. Examples of such solutions include liquors from industrial processes such as pulp and paper processes, municipal sewage, agricultural operations, food preparation liquid waste, and similar liquid systems. There are, of course, many other examples of situations in which scrubbing technology generally, and the principles of the present invention in particular, can be applied.

Scrubbers of various types are known. Removal of fine particles of dust, oxides of sulfur, odorous compounds, and similar contaminants from gas streams is a priority for environmental control abatement programs developed by regulatory agencies to minimize the impact of industrial processes on the natural environment. Devices currently in use for removal of pollutants include cyclones, bag filters, electrostatic precipitators, and high energy scrubbers. Typically the input to output efficiency of these devices range from 85% to $\geq 99.99\%$, with the high energy scrubbers being the most efficient, and the cyclone and inertial separators the least. Input to output efficiency is defined as the total concentration of particles of all size ranges in the outlet gas stream from the system as a percentage of the concentration in the total input to the gas cleaning unit.

The type of unit for a specific application is determined by a number of factors including type of industrial process, type and size of particle released, temperature of the gas stream, process economics, land use adjacent to the site, and a number of other factors. High energy scrubbers using limestone and water slurry scrubbing solutions have been successfully used to scrub sulphur from the combustion gases produced when burning sulfur containing fuels, such as coal, heavy fuel oil, and so on.

A common method of scrubbing, for example, exhaust gases, is to spray a scrubbing medium, such as water, across the exhaust gas passage, or to force the exhaust gases through a continuously fed curtain of water, or along a channel with wetted sides. These technologies for scrubbing fine particles from gaseous streams have relied on mechanical shear systems to produce large quantities of fine droplets of scrubbing solution. In each instance droplet surface area is the controlling parameter determining the efficiency of the scrubber. To increase scrubber droplet surface area for a given water mass, the average droplet diameter must decrease. The energy required to decrease the average droplet size and thus increase the average droplet surface area increases sharply. Thus the efficiency of conventional scrubbers for fine particle removal is a function of the energy input as measured by the pressure loss across the scrubber. Typical high efficiency scrubbers (>99% efficiency) operate with pressure drops in the range of 45–60 inches of water. Such units have high capital costs, and high energy and maintenance costs.

As the ratio of fine ($\leq 74$ micron) particles to coarse ($\geq 75$ microns) increases in the gas stream the degree of difficulty of achieving high collection efficiency increases. Similarly, chemical reactions with gaseous products and/or contaminants is a surface controlled phenomenon.

The conceptual opposite of this conventional approach is to force jets or streams of gas into baths of liquid, the gases being forced into the liquid at some depth below the free surface of the liquid. U.S. Pat. No. 4,300,924 of Coyle, issued Nov. 17, 1981 describes a device for scrubbing diesel engine exhausts by driving the exhaust gases through a straight pipe into a tank of water, and allowing the exhaust gases to bubble through the water. The Coyle apparatus operates when the head of the exhaust gases is sufficient to force them out the plain cut end of the pipe. There is no indication that Coyle considered whether bubble size increases as the flow of exhaust gases increases.

Swiss Patent 629 972 of Lüthi et al, issued May 28, 1992, shows a scrubber having one round cylinder nested within another. Gases enter the annular space between the cylinders through a targeted inlet. The bottom of the scrubber is filled with a scrubbing fluid. An array of paddles is located to generate a swirling effect as the gases pass through the liquid to reach the inside of the inner cylinder. Although at least one embodiment permits variable pitch paddles, the paddles are relatively for apart so that the flow passages are wide. The device also lacks a straightening or vortex breaker section to encourage bottom settling.

The mechanism of the scrubbing process appears to be a complex one involving two phase flow. It appears that the process is analogous to a heat transfer or mass transfer phenomenon, or both at the same time, in which the efficiency can be related to one or more of the applicable, Reynolds, Prandtl, Schmitt, Sherwood and Nusselt numbers. For heat and mass transfer, generally, it is advantageous to decrease the transport distance, and increase the cross section of the transport path. As concerns path length, since the Prandtl number for a liquid scrubbing medium, such as water, is typically an order of magnitude greater than Prandtl numbers for gases, it appears that the critical heat and mass transfer distance is related to the characteristic dimension of the bubbles, for which the mean bubble diameter is a proxy. Similarly, the cross section of the interface between the gas and liquid phases of the mix is defined by the surface area of the bubbles, a number that is, again, related to mean bubble diameter. Empirically, it is the observation of the present inventors that the efficiency of scrubbing increases as mean bubble size decreases per unit of exhaust gals flow.

Relating the scrubbing phenomenon, by analogy, to the heat and mass transfer phenomena, as the mean bubble diameter decreases the interacting surface area interface between the gas and liquid phases increases per unit volume of either gas or liquid. This decreases the mean transport distance within the low density, low thermal conductivity gas phase, as bubble size decreases. Jets, or streams, of bubbles released in the liquid in a manner to increase the turbulence of the mix still further enhance scrubbing efficiency. That is, a jet of relatively small, relatively high velocity bubbles with tend to result in scrubbing that is more, effective than a flow of relatively large, low velocity bubbles for the same flowrate. Inasmuch as both heat and mass transfer phenomena are time dependent, it is also advantageous to encourage retention of small sized bubbles for a relatively lengthy period of time.

In summary, it would be advantageous to increase the gas retention time within the liquid scrubbing solution, to increase the level of turbulence and mixing within the scrubbing solution, to reduce the bubble size, and thereby to increase the reaction surface area per unit of flow, to improve the circulation of the scrubbing liquid, or liquid like, medium.

SUMMARY OF THE INVENTION

In one aspect of the invention there is a member for a scrubber comprising a conduit having defined therein an intake for receiving gases to be scrubbed. The conduit has a wall. Porting is defined in the wall, the porting being for immersion in a scrubbing medium. When so immersed, the porting extends from a first depth to a second depth. The conduit has a passage for transporting the gases from the intake to the porting. The porting includes at least one flow splitter for encouraging formation of more than one stream of bubbles through the porting.

In an additional feature of that aspect of the invention, the porting is shaped to encourage turbulent mixing of the gases with the scrubbing medium. In a further additional feature of that additional feature, the porting is angled whereby gases exiting said porting impart angular momentum to the scrubbing medium in the bath. In yet a further additional feature, the conduit is a cylindrical pipe having a longitudinal axis. The pipe has a pipe wall. The porting is an array of slots let through the pipe wall at an angle to release the gases into the scrubbing medium in a direction having a component normal to said pipe wall and a component tangential to said pipe wall and perpendicular to said longitudinal axis.

In another additional feature of that aspect of the invention, the porting is arrayed to present a greater flow area as the head of the gases increases. In another additional feature of that aspect of the invention, the conduit has an effective cross sectional flow area and the effective cross sectional flow area of the porting is less than the effective cross sectional flow area of the conduit.

In another aspect of the invention, there is a scrubber for scrubbing a gas. It comprises a scrubbing vessel for containing a scrubbing medium. The scrubbing vessel has a reaction zone and a quiescent zone. A conduit has defined therein an intake for receiving gases to be scrubbed, outlet porting, and a passage for transporting the gases from said intake to said porting. The conduit is mounted to present the porting in an immersed position relative to the scrubbing medium in the reaction zone. The porting includes at least one turbulence generator for encouraging turbulent mixing of gases exiting the conduit with the scrubbing medium.

In an additional feature of that aspect of the invention, reaction zone and the quiescent zone are separated by a turbidity interrupter. In another additional feature of that additional feature, the turbidity interrupter is chosen from the set of turbidity interrupters consisting of at least one of (a) a curtain wall partition; and (b) a vorticity breaker. In another additional feature of that aspect of the invention the porting includes an array of separated fingers having gas flow apertures defined therebetween. In still another feature of that aspect of the invention, the conduit has a peripheral wall extending between a first depth and a second depth. The turbulence generators are elements of the porting let through said peripheral wall.

In still another additional feature of that aspect of the invention, conduit has a peripheral wall that extends in a longitudinal direction. The direction has a vertical component relative to the scrubbing medium. The turbulence generators are elements of the porting let through the peripheral wall in a direction having a component normal to the wall and another component horizontally tangential to the wall. In an additional feature of that additional feature, the turbulence generator is angled at an angle in the range of 10° to 75° relative to said normal wall.

In still yet another additional feature of that aspect of the invention the scrubber further comprises a scrubbing fluid supply system mounted to introduce a flow of scrubbing medium into the conduit. In still another additional feature of that aspect of the invention, the member is an intake member mounted amidst a scrubbing fluid reservoir. The conduit has an inner wall, and the intake has a weir mounted to encourage scrubbing fluid from the reservoir to flow along the wall. In yet another additional feature of that aspect of the invention, the scrubber has a secondary scrubber stage mounted to intercept gases emanating front the porting. The secondary scrubber stage also has turbulence generators mounted to lie immersed in the scrubbing medium. In an additional feature of that additional feature, the secondary scrubber stage has a trap for the gases. A turbulence generator of the secondary scrubber stage is let through the trap at an angle to impart a component of momentum to gases exiting therefrom that is opposed to the horizontally tangential component of the turbulence generator of the conduit.

In yet a further additional feature of that aspect of the invention, the conduit is a cylindrical pipe having a pipe wall and a longitudinal axis. The porting is an array of apertures let through the pipe wall. The porting extends between a first depth and a second depth relative to said reaction zone. At least one of the apertures is let through the wall at an angle having a direction that has a component normal to the pipe wall and a component tangential to the pipe wall and perpendicular to the longitudinal axis. The pipe has a barrier planed about the periphery thereof to intercept bubbles emanating from the apertures. The barrier has a second set of apertures let at an angle therethrough in a submerged location relative to the reaction zone, for encouraging the formation of bubbles. The scrubber has at least one turbidity breaker between the reaction zone and the quiescent zone, to permit exchange of scrubbing fluid therebetween, and the barrier is surrounded by a settling column.

In another aspect of the invention, there is a method for passing a gas through a liquid. The method comprises the steps of forcing the gas through porting submerged in the liquid to form bubbles, encouraging the breaking of the bubbles, and settling the liquid in a quiescent zone to permit bubbles entrained in the liquid to separate out.

In an additional feature of that aspect of the invention, the step of forcing includes the step of directing the gas into the liquid at an angle for imparting momentum thereto. In another additional feature of that method, the step of forcing includes compelling the gas to move from a gas manifold through the porting to a mixing zone. In an additional feature of that additional feature, the step of settling includes permitting the liquid to settle in a settling column physically segregated from the mixing zone. In yet a further additional feature of that additional feature, the step of settling includes passing the liquid through a vorticity breaker.

BRIEF DESCRIPTION OF THE DRAWINGS

The principles of the present invention are explained below in the context of a description of an exemplary, and non-limiting, embodiment of the invention, and with the aid of the following illustrative Figures.

DETAILED DESCRIPTION OF THE INVENTION

Figure 1:
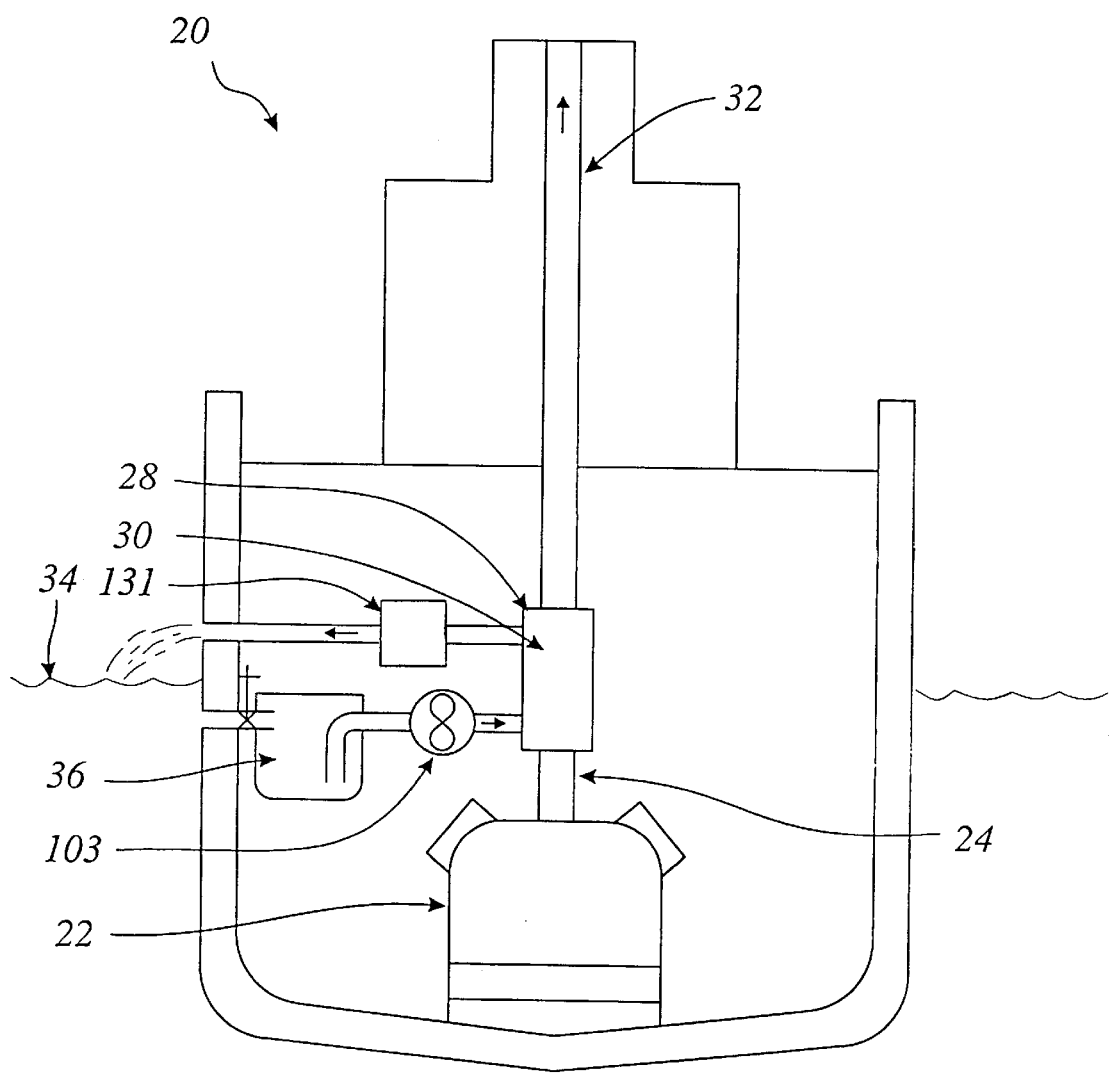
FIG. 1 shows a schematic illustration of a scrubber embodying the present invention as employed in a marine installation.

The description which follows, and the embodiments described therein, are provided by way of illustration of an example of a particular embodiment, or examples of particular embodiments, of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order more clearly to depict certain features of the invention.

By way of a general overview, in FIG. 1 a schematic is given of a marine diesel installation of a scrubber according to the present invention. A ship, indicated schematically as 20, has an engine 22 whence exhaust gases are carried to an uptake stack 24. Stack 24 leads to a resonator compartment or equipment space, 28, where the scrubber 30 has between installed in place of a conventional resonator. The gaseous discharge of scrubber 30 is carried up tail stack 32 and exhausted to ambient. Scrubber 30 draws a supply of scrubbing medium, in the example seawater, from a scrubbing medium reservoir, which, in the case of a ship, may be the ocean 34, or may, as indicated, include an intermediate holding tank 36. In the preferred embodiment scrubber 30 replaces a conventional resonator, and handles the entire flow of exhaust gases from engine 22. However, if a resonator is desired, notwithstanding the presence of a scrubber, such as scrubber 30, or if it is desired only to scrub a portion of the exhaust gas flow, such variation or alteration from the preferred embodiment is possible.

Figure 2:
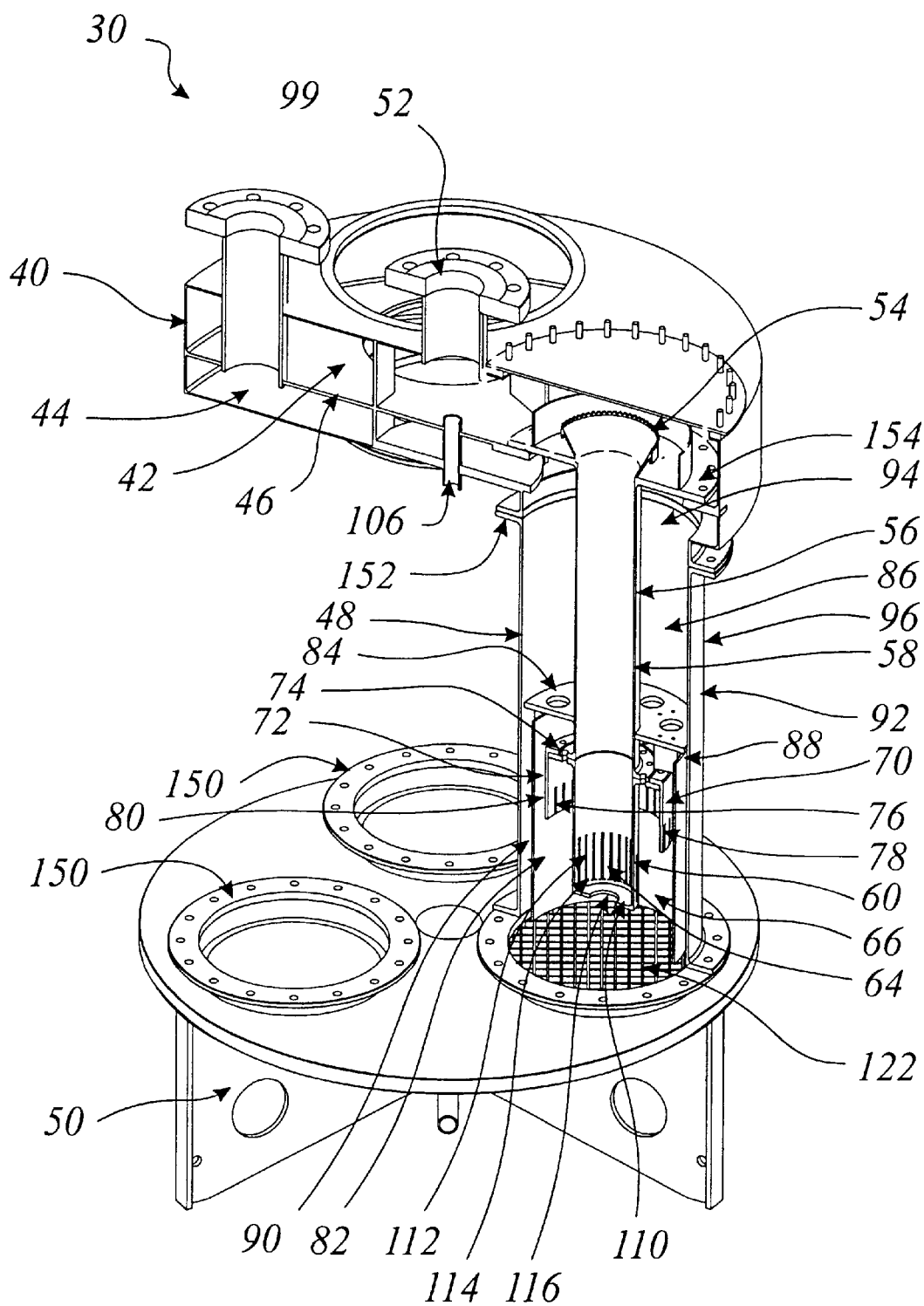
FIG. 2 is a partial, isometric sectional view of an example of a multiple reaction cell scrubber system according to the principles of the present invention suitable for employment in the marine installation of FIG. 1.
Figure 3:
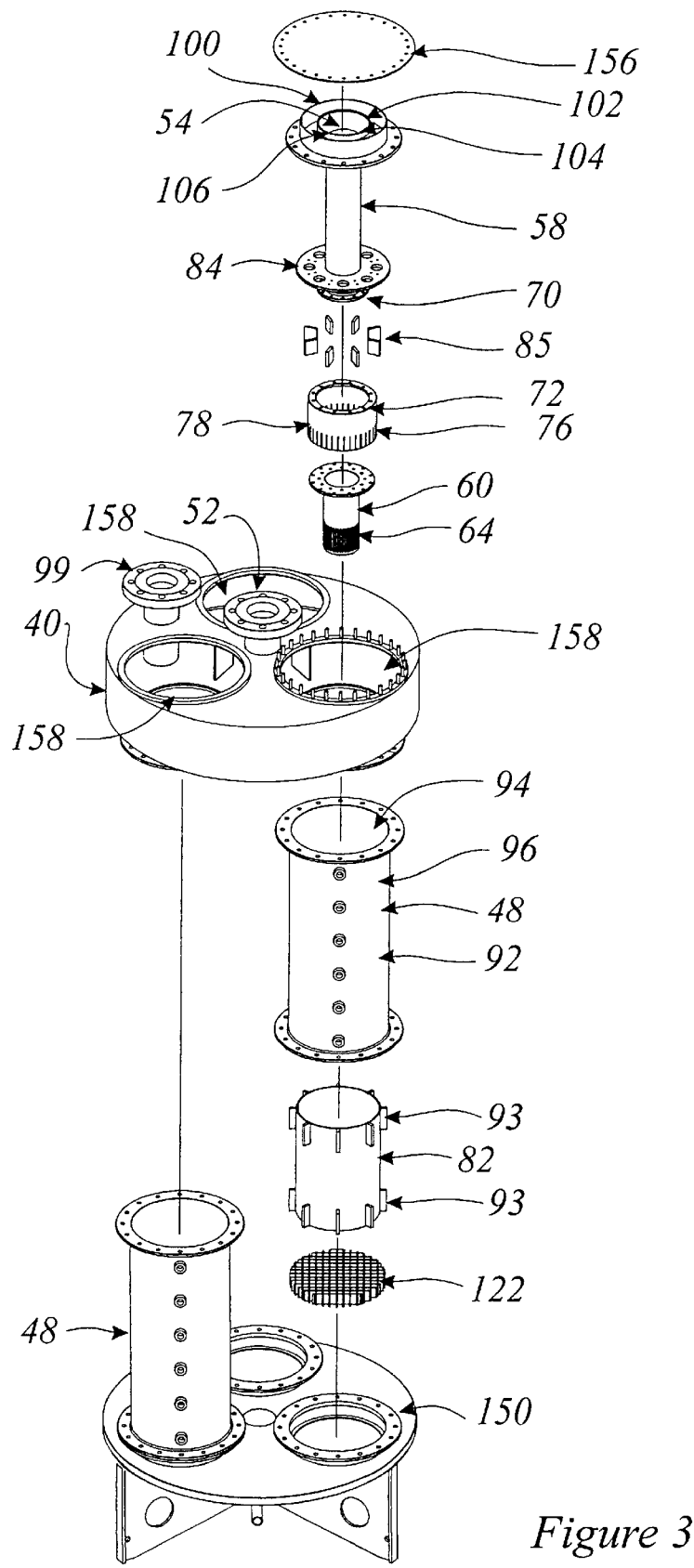
FIG. 3 is an isometric view of the scrubber system of FIG. 2 showing an assembled reaction cell and an exploded view of another reaction cell.
Figure 4:
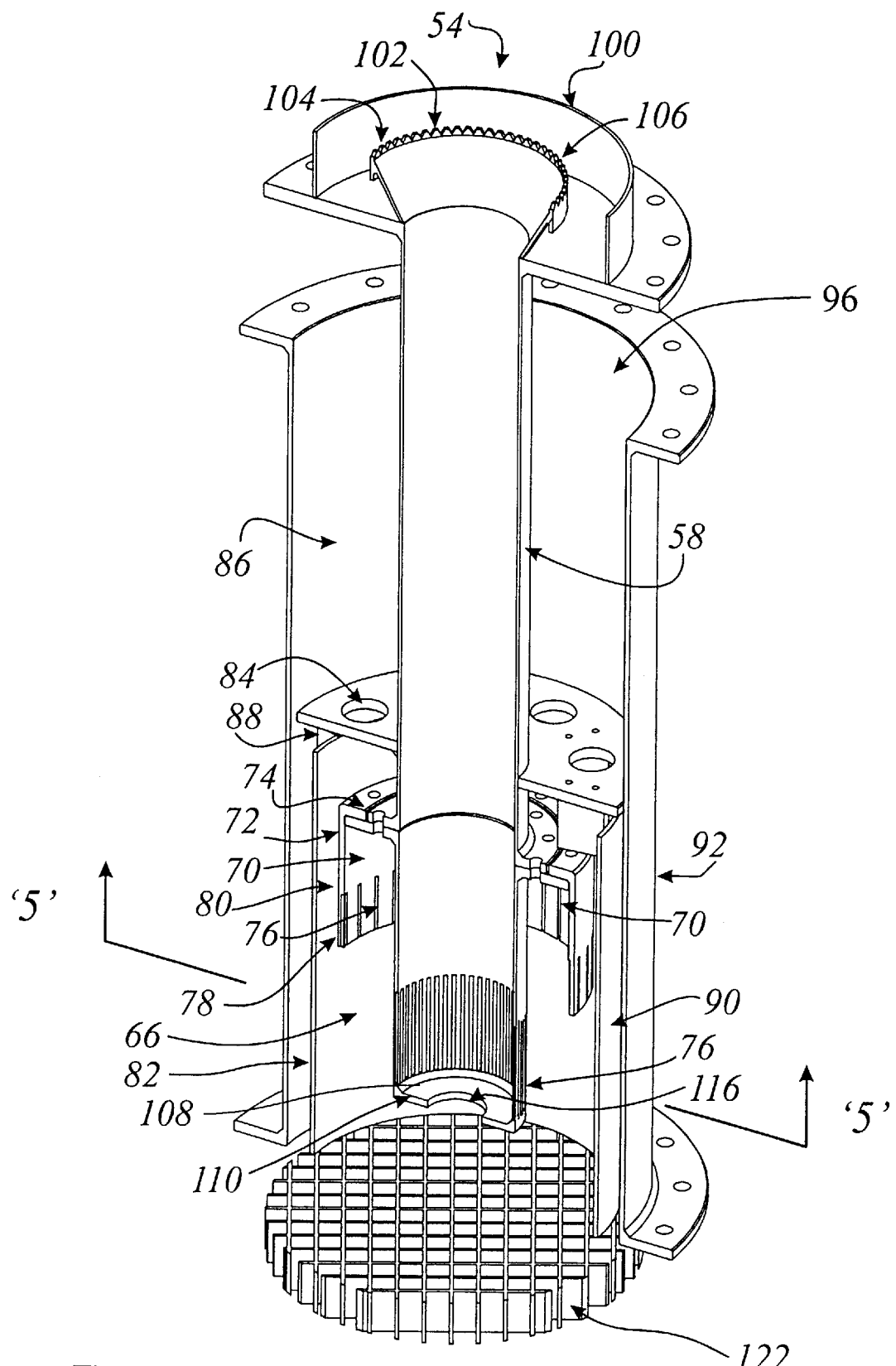
FIG. 4 shows an isometric, view of the assembled reaction cell of FIG. 3 at a section along a vertical plane.

Referring to FIGS. 2 and 3, the preferred embodiment of the low-pressure drop gas scrubber 30 of the present invention is constructed from three major subassemblies. The first sub-assembly is an upper plenum assembly for conveying inlet and outlet gases, indicated generally as 40. It includes an upper plenum chamber in the nature of an intake manifold 42 that forms a "gas supply" plenum for both scrubbing liquid and the gas to be cleaned, and a lower plenum chamber in the nature of an exhaust manifold 44, which acts as a discharge plenum for cleaned gas. Intake manifold 42 and exhaust manifold 44 are separated by a diaphragm plate 46. The second major subassembly is the central reactor section, indicated generally as 48. The third major subassembly is the bottom settling tank, indicated generally as item 50.

When fully assembled, the unit depicted in FIGS. 2 through 8 has three parallel reactor sections 48. It would be would be suitable for processing 400° C. exhaust from a 280 hp diesel engine having less than 600 SCFM (standard cubic feet per minute) exhaust gas flow rate (corrected to standard temperature and pressure), that is, 200 SCFM per reactor section 48.

Figure 6:
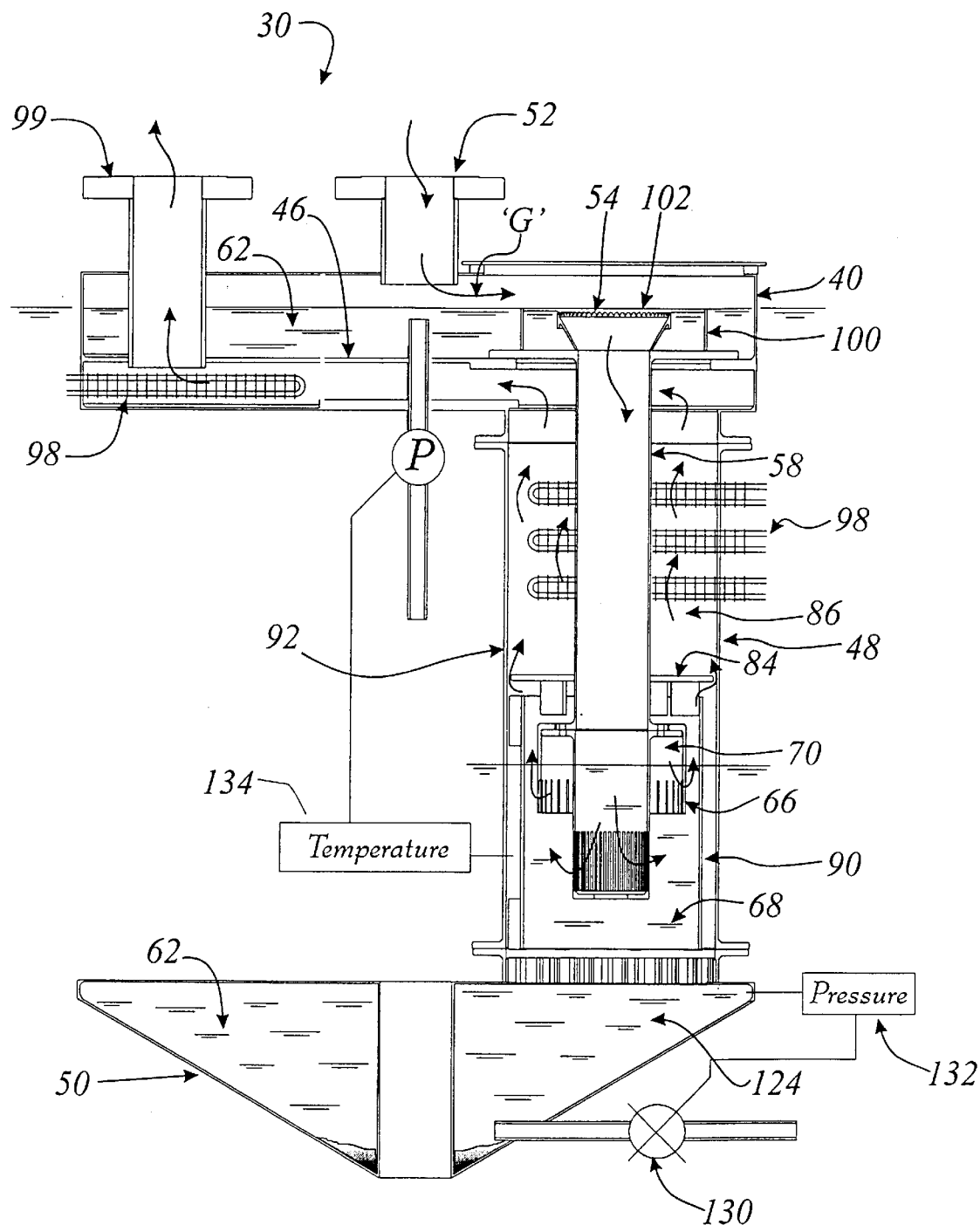
FIG. 6 is a cross-sectional view of the scrubber system of FIG. 1, as operating, showing gas flow paths.

In order to clarify the flow of gas and liquid in the present invention, the arrows 'G' in FIG. 6 indicate a path through the preferred embodiment of a low-pressure drop gas scrubber of the present invention. Liquid flow is described below.

In operation, dirty gas or air, namely the exhaust from engine 22, enters the intake plenum of scrubber 30, at the pipe and flange fitting indicated as inlet port 52 of intake manifold 42, and is conveyed to the inlets 54 of the reactor cells 56 of reactor section 48. The dirty gases flow down a conduit in the nature of a round, cylindrical 5" dia. downconer pipe 58, (that is, generally parallel to the longitudinal axis of pipe 58), to reach its discharge end 60. In operation the head of the dirty gas is sufficient to force the surface of the scrubbing medium 62 inside down coner 58 downward, thereby exposing at least a portion of an array of apertures, or flow splitters, in the nature of slots 64, let through and ranged about, the periphery of down-coner 58. The gases are forced out slots 64, and form a stream, or jet, of bubbles, emanating therefrom into scrubbing medium, 62.

Figure 7:
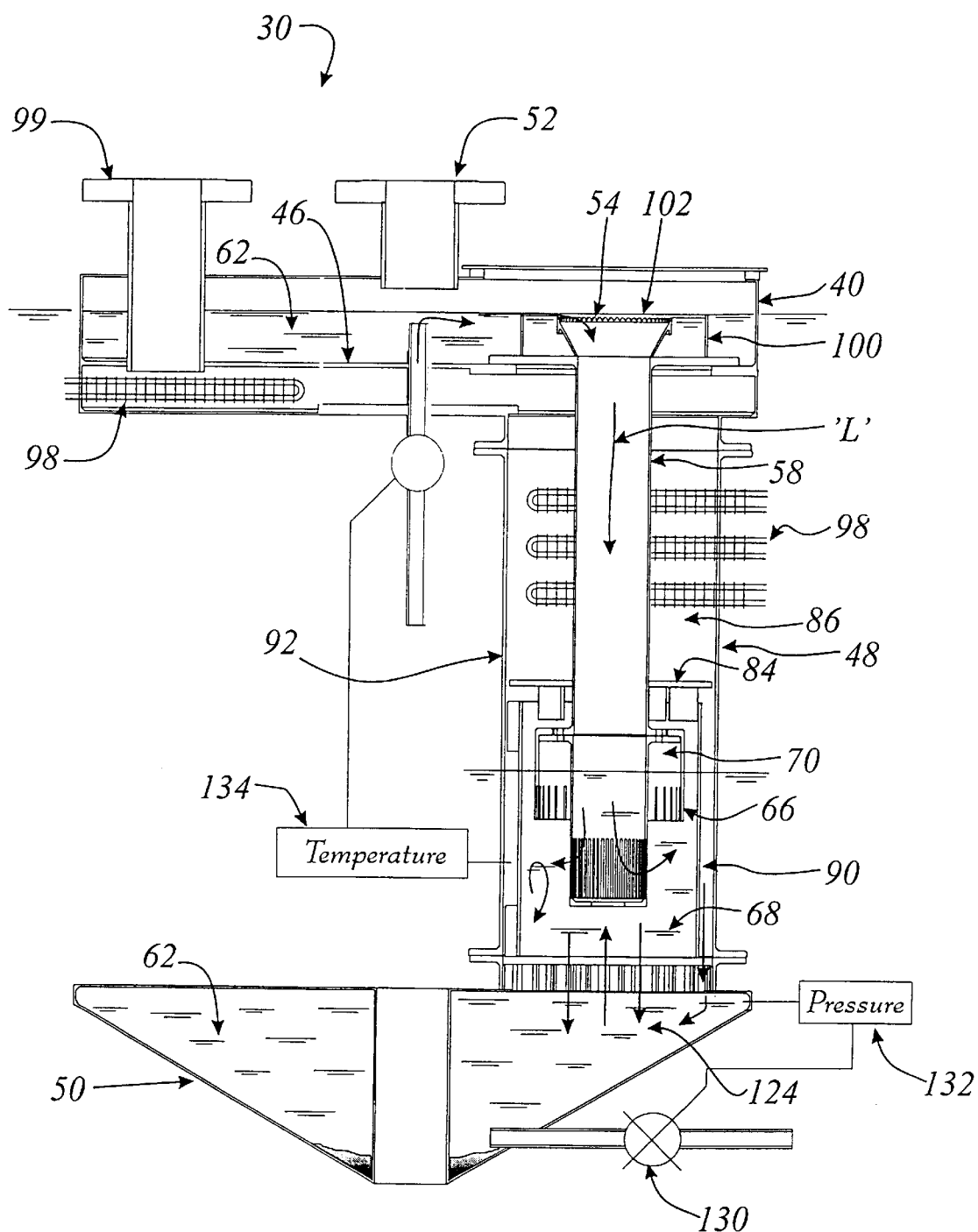
FIG. 7 is a cross-sectional view of the scrubber system of FIG. 6, as operating, showing scrubbed particulate paths.

The hydrostatic pressure differential between the inside and the outside walls of the down-coner pipe 58 is equal to the total pressure drop that the scrubber of the present invention imposes upon the gas stream. The static liquid level in the reaction chamber 66 is shown in FIG. 7. The back-pressure on the gas-stream is determined by the height of this mean liquid level in the system. In the preferred embodiment, in normal operation for a gas flow of 200 SCFM per reaction cell, the hydrostatic pressure difference between the inside and outside walls of the down-coner pipe 58 is 3½ inches water column, but can be from one inch water column to ten inches water column. Scrubbing medium 62, such as seawater, is contained within a scrubbing medium reservoir in the nature of a bath, 68 which forms the bottom portion of reaction chamber 66.

Figure 5:
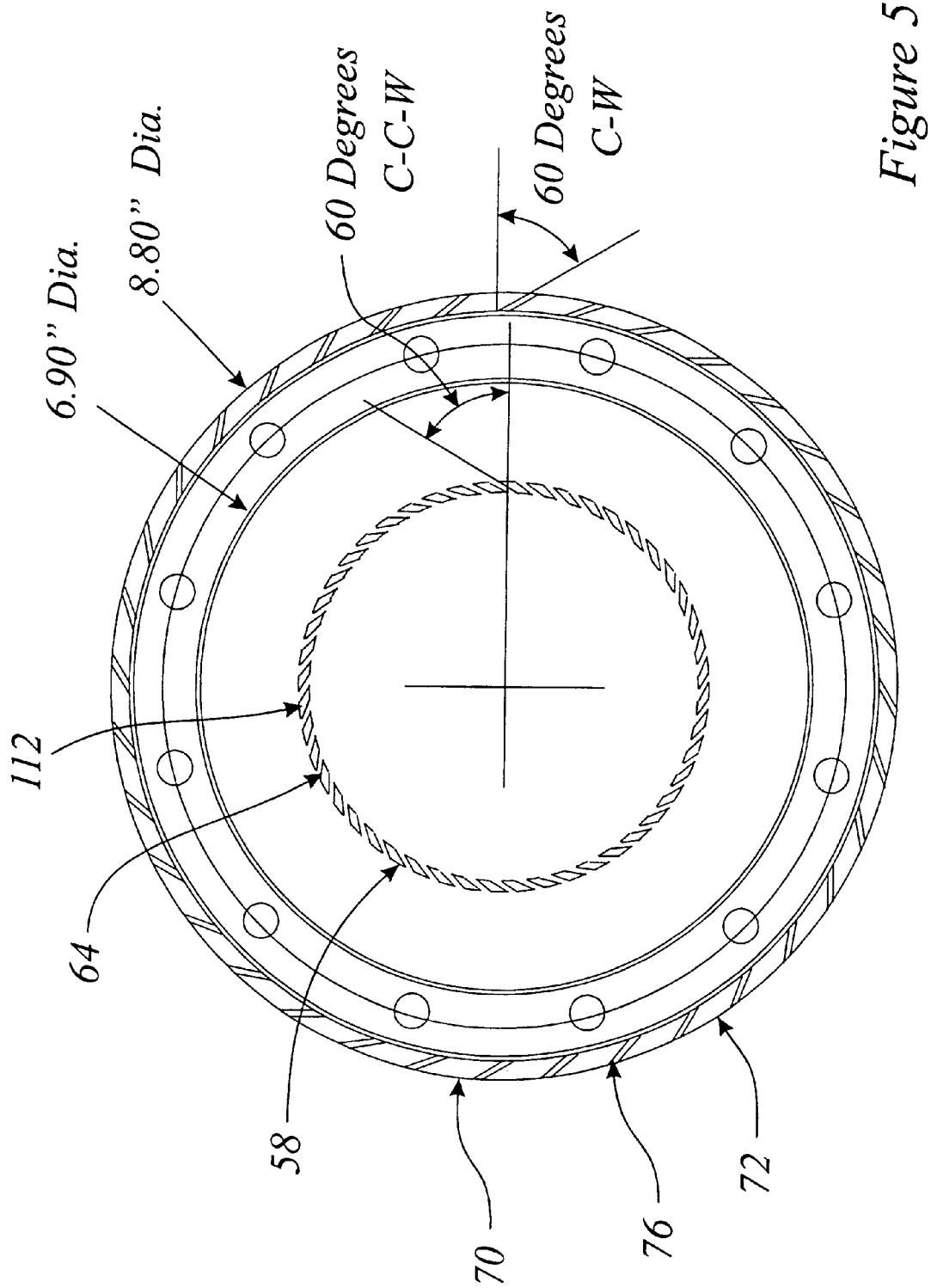
FIG. 5 is a cross sectional view of assembled reaction cell of FIGS. 3 and 4 taken on section '5—5' as indicated in FIG. 4.

As seen in FIG. 5, slots 64 are let through the wall of pipe 58 at an angle to give the gases both radial radial tangential components of velocity relative to the pipe wall. The momentum of the gases tends to cause the adjacent scrubbing medium to roil and swirl turbulently about pipe 58. The depth of the scrubbing medium in bath 68 is controlled and is maintained, in the non-operational state, at a level at least deep enough to cover the uppermost extremity of slots 64. Bath 68 is in fluid communication with bottom settling tank 50, which is in common communication with all three reactor sections 48. The momentum of the gases forced out through slots 64 also tends to discourage them from clinging to the outside face of pipe wall 58, encouraging them, instead, to mix with the scrubbing medium. In this way, slots 64 not only act as bubble generators, but also as a first stage vortex generator.

The buoyancy of the bubbles tends to cause them to rise in the scrubbing medium, while also coalescing into larger bubbles. At the same time, in the case of seawater, the inlet temperature of the scrubbing medium may be of the order of 5° C. Given the relatively large temperature difference between the gases and the seawater, and the intimate vigorous engagement of the gas and liquid phases, the gas bubbles will tend to shrink rapidly as the gases cool.

Bubbles leaving slots 64 will tend to rise and be captured by a secondary trap 70, in the nature of an open bottomed annular wall, or barrier 72 having a sealed top in the nature of closed gas cap 74. As bubbles collect under cap 74, gas is forced out through a secondary array of bubble generating flow splitters in the nature of slots 76 let through the 7 inch dia. perimeter defined by depending skirt 78 of barrier 72. Slots 76 are let through skirt 78 at an angle to impart tangential velocity to bubbles, break up undesirable large bubbles, and generate new, relatively finely sized bubbles. In so doing, slots 76 act as a second stage vortex generator. It is preferred that slots 64 and 76 be cut to direct the vorticity of the bubbly mixture in bath 64 in opposite directions. This encourages increased turbulence, while reducing the inertial effect, or spin-up, of the bubbly mixture.

The newly formed bubbles exiting from slots 76 form part of a vigorously frothy mix that enters an annular passageway 80 defined between the outer wall of barrier 72 and a baffle in the nature of a vertical 10" dia. circumferential curtain wall 82. These bubbles swirl tangentially, and upwardly, to meet a baffle in the nature of a breaker plate 84 which is spaced at a level above the top of curtain wall 82. This vertical spacing is maintained by a set of radially extending spacer vanes 85. Scrubbing liquid that collects on plate 84, or which escapes through the gap 88 between the lower surface of plate 84 and the upper edge of curtain wall 82 drains into a quiescent annular settling column 90 bounded by the outer face of curtain wall 82 and the inner face of the round 12" dia. cylindrical reaction cell casing 92 in which reacted scrubbing liquid can flow downward into settling tank 50. Curtain wall 82 has stubs 93 to encourage concentric placement within casing 92.

In summary, at the bottom of down-coner pipe 58 a bubble and vortex generator imparts tangential velocity to the bubbles encapsulating the inlet gas, and fine scale bubbles are generated due to the relatively small width of the vortex generator openings, namely slots 64. Fine bubbles encapsulating the inlet gas appear to be subject to relatively large centrifugal forces which provide intensive gas phase to liquid phase turbulence and contact. The turbulent mixture of fine bubbles and the scrubbing medium rise upward to a gas-filled cap 74, the edge of which has a second set of bubble and vortex generating openings, namely slots 76. The second stage once again imparts a tangential velocity to the gas and liquid mixture, and it breaks up coalesced bubbles into fine bubbles, thus enhancing the surface contact area for reaction.

As indicated in FIG. 6, gas can escape upwards either in the space between casing 92 and the periphery of breaker plate 84 or through the holes in breaker plate 84. The velocity of the scrubbed gas decreases as it travels upward from breaker plate 84 into the relatively large cross section of an open freeboard zone 86 contained in the upper half of reaction housing 96, and bounded by plate 84, casing 92 and the lower face of upper plenum 40. This provides another opportunity for liquid and particulates to settle out before the exhaust gases exit through outlet ports 94 into exhaust manifold 46. This tends to reduce, or eliminate carryover of scrubbing solution droplets from the reaction zone into the exhaust gas (carried away from the unit.

The exit gases at this point are at or near 100% relative humidity, at a temperature, typically, between 60 and 70° C. To reduce scrubbing solution carry-over and to increase heat recovery, heat exchangers or de-misters 98 are optionally installed, either in the freeboard zone 86 of the reactor section 48 above breaker plate 84, or in the exhaust manifold plenum. Liquid droplets which condense on the de-mister or heat exchanges surfaces can drain back to the liquid re-circulation zone outside of curtain wall 82. Scrubbing solution supply can be directed through the pipes of heat exchanger before being fed into inlet plenum 40.

From exhaust manifold 44 the exhaust gases are carried out through a flanged chimney pipe fitting 99 which mates with the downstream portions of a conventional exhaust pipe, as indicated by tail stack 32. The scrubbing solution lying above the diaphragm plate 46 also helps to cool the exhaust gas.

FIG. 7 shows the liquid levels in the low-pressure drop gas scrubber of the present invention. The arrows 'L' in FIG. 7 indicate the flow of scrubbing liquid through the system. Intake manifold 42 has, concentrically located about the inlet of down coner pipe 58, a dam 100 and, nested within dam 100, a weir 102. Weir 102 has a crenellated lip 104, the crenellations being formed in the shape of a serrated sawtooth 106. In the preferred embodiment the saw teeth are about 0.5" inches high and are cut on a 45 degree angle. That portion of upper plenum 44 lying below the level of dam 100 acts as a reservoir for scrubbing fluid.

Sea water enters the system through an inlet pipe 106. The water level increases to a depth where it overflows dam 100, and water between dam 100 and weir 102 flows down the walls of the down-coner pipe 58. A pump 103 (see FIG. 1) feeds in more fluid as required to maintain a desired flow rate over dam 100 and weir 102. Dam 100 acts to hold back the inlet scrubbing liquid and to control the flow rate of scrubbing liquid flowing downward along the inner surface of the pipe 58. The serrated upper edge of weir 102 encourages the formation of a uniform sheet flow down the walls of pipe 58 such that, ideally, a continuous flow of liquid covers the inner face of down coner pipe 58.

In this way the embodiment illustrated provides an arrangement of overflow dams, or weirs, for circulating fresh scrubbing solution downward along the interior wall of the primary gas supply zone that is, the inside of pipe 58, encouraging a drop in the gas temperature. It is possible to operate a scrubber without this feature. However, when treating hot gases, the constant flow of scrubbing fluid also tends to maintain down coner pipe 58 at a cooler temperature than might otherwise be the case.

Fluid flowing down the inner wall of down coner pipe 58 will either be carried with the gas flow and out slots 64, drip down into the sump 108 of down coner pipe 58, or be evaporated by the gases. In this way, pipe 58 introduces both inlet gas and scrubbing liquid into the reaction zone of bath 68 between the vortex generator vanes, or fingers, and slots 64. As the mixture of inlet gas and scrubbing liquid passes through slots 64, it is accelerated, and directed tangentially into the liquid of bath 68, as described above.

Sump 108 of pipe 58 has an annular bottom plate, or retainer 110. Fingers 112 are defined between adjacent slots 64, and have distal ends 114. Retainer 110 is attached to distal ends 114 and serves to stabilize them structurally. Retainer 110 has defined in it a central relief opening 116. Opening 116 permits scrubbing fluid more easily to find its own level in pipe 58. The unexposed, lower portions of slots 64 also permit inflow of scrubbing fluid, both in operating and non-operating modes. Opening 116 also provides a pressure relief if slots 64 cannot cope with the inflow of gases down pipe 58.

In bottom settling tank 50, the reaction zone of bath 68 lies above a matrix, or waffle, of straighteners in the nature of a honeycomb barrier 122 having vertically oriented hexagonal channels. Honeycomb barrier 122 acts to retard entrainment of turbulence and vorticity from reaction zone 120 and discourages or prevents it from penetrating into the relatively quiescent lower portion 124 of settling tank 50. Waste scrubbing solution settles toward the conically tapered bottom of portion 124. The conical section collects and concentrates solids as they gravimetrically separate from the solution. Sediment which collects in the system is also flushed out of the scrubber through drain 126 and valve 130. Fluid cared out valve 130 can be collected in a sludge tank and filter 131 for further filtering, with cleaned waste-water being discharged. Although only one vortex breaker is shown, that is barrier 122, more than one could be used; whether in a stack or with an intermediate free layer of liquid between. It is preferred that between one and three honeycomb plates be positioned below the bottom of down-coner pipe 58 to act as turbidity interrupters and thereby to discourage vortex entrainment below pipe 58.

As thus described, scrubber 30 develops a zone of reduced turbulence within the scrubbing solution. This permits separation of fine particles or solids produced from chemical reactions from the scrubber solution. This zone permits solids settlement and removal for disposal. The narrow annular zone of settling column 90 between curtain wall 82 and casing wall 92 is also a zone of reduced turbulence. The flow in settling column 90 is relatively slow, and downward. Very small bubbles carried in this flow can circulate back up into bath 68 and can persist for relatively long periods of time.

Also in the manner described, scrubber 30 provides a gas phase to liquid phase scrubber in which the surface area for reacting the gas phase with the liquid phase is developed by a low-energy physical phenomena which produces fine-sized gas bubbles within the liquid scrubbing solution.

Figure 8:
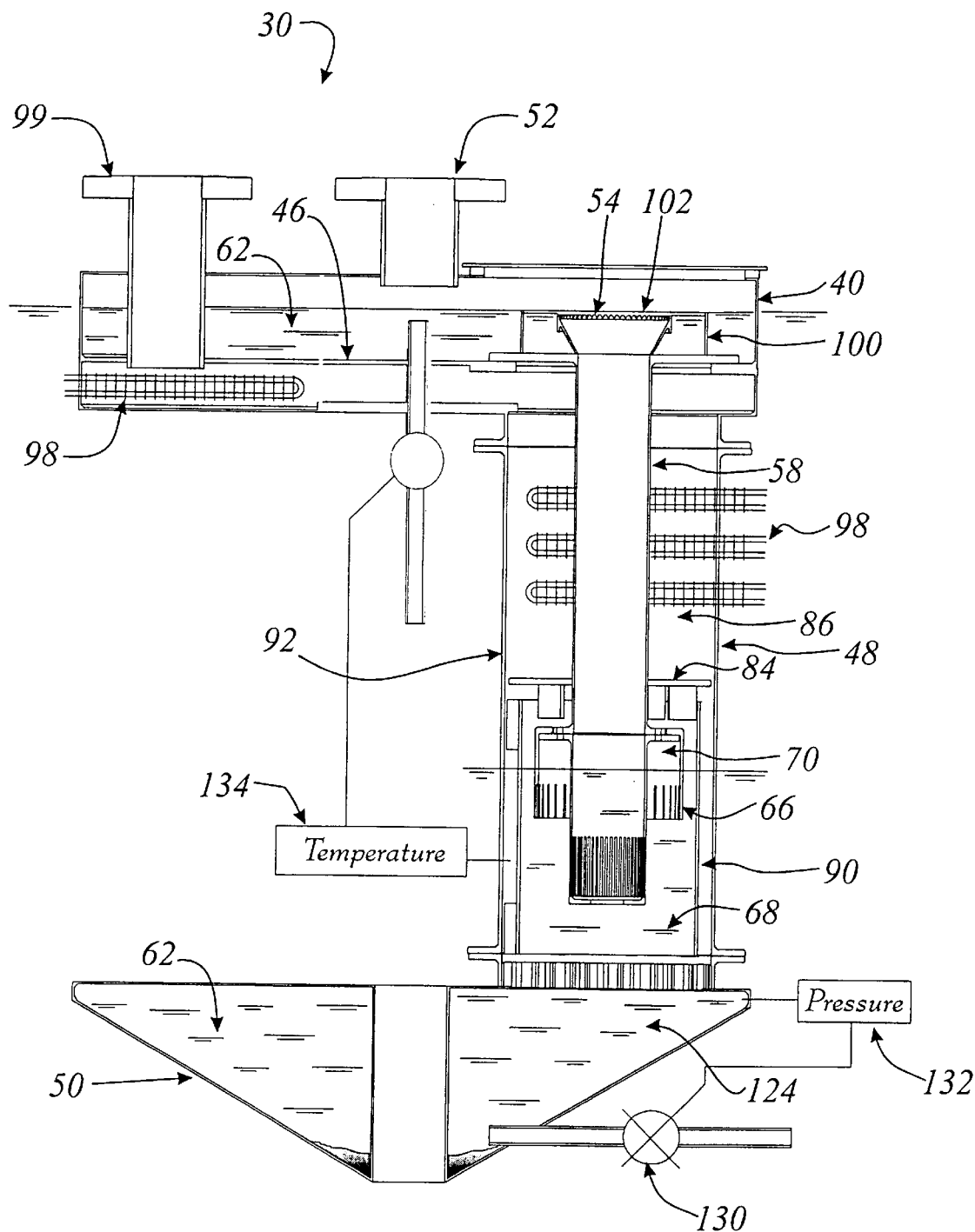
FIG. 8 is a cross-sectional view of the scrubber system of FIG. 6, as operating, showing control points.

FIG. 8 shows the control points for the preferred embodiment of relatively low-pressure drop scrubber 30. The mean liquid level is controlled by actuation of drain valve 130 based on the hydrostatic pressure measured at point 132. Drain valve 130 is normally closed, with a rise in pressure at control point 132 resulting in incremental opening of valve 130 to allow a greater outflow. The back pressure of the scrubber 30 can be altered by changing the depth of the scrubbing medium in bath 68. A deeper bath will tend to yield a more efficient device, but will impose a higher back pressure on the engine.

The temperature of the scrubbing liquid is controlled by an input from a temperature sensor 134 in the down-flow region between curtain wall 86 and the housing, that is, casing 92. When a condition of the liquid temperature exceeding a pre-set limit occurs at the control point at sensor 134, pump 103 increases inlet liquid flow into the system. The liquid level control system senses an increase in the liquid level, and responds by opening drain valve 130, incrementally, thus causing the hot liquid to be diluted by the cold inlet liquid from pump 103. For most steady state applications in which an engine runs at a substantially constant speed for many hours, the inlet flow-rate at pump 103 will be substantially constant for long period of time, and an over temperature condition at 134 will simply increase the inlet flow-rate to bring the temperature back down to an acceptable level. The actual flow rate will be a function of the inlet water temperature and the inlet gas flow rate and temperature.

As alluded to above, scrubber 30 is constructed of modules. Scrubber 30 has an inlet gas and liquid plenum which can be connected to feed one, or several down-coner pipes and weirs that enable fresh scrubbing liquid and inlet gas to pass concurrently downward into the liquid reaction chambers. The upper plenum assembly can be fabricated to direct flow to as many central reactor sections as may be called for in a particular installation. However, while it is possible to make custom designed plenums, it is preferred to manufacture larger capacity units by increasing the number of standard sized scrubber modules, rather than by having to produce units of different sizes. This can be done by assembling gangs of prefabricated multi-chamber units. It is not necessary to use all of the possible openings in each prefabricated section.

In the example shown in FIG. 2, at its lower end, central reactor section 48 is mounted to bottom settling tank 50 on a circular sealed flanged fitting 150, that is one of three such fittings shown. Honeycomb barrier 122 seats on a circumferential shoulder within flanged fitting 150. Similarly, at its top end, casing 92 of reactor section 48 is attached to upper plenum assembly 40 at another sealed circular flange fitting, 152. Dam 100 and weir 102 are formed as part of a single assembly with down coner pipe 58, which is fastened to diaphragm 58 at a sealed flanged fitting 154. Finally, as shown in FIG. 3, access to fitting 154 is provided by removal of a blanking plate 156 mounted to each access port 158 located in top face of upper plenum assembly 40. If it is desired not to use one of the three reactor cells, then that cell can be removed and blanking plates fitted to fittings 150, 152, and 154.

Alternative versions of upper plenum assembly 40 and bottom settling tank 50 can be made with more prefabricated reactor cell mounting locations. Plenum assembly 40 and bottom settling tank 50 need not be generally circular in plan view, as shown, but could be square, rectangular, hexagonal, or some other shape chosen to fit an available equipment space. Gangs of scrubber assemblies can be mounted either side by side, or in a vertical stacking arrangement, permitting an effective use of deck space in the engine room of a ship, or other power plant room, and also permitting an effective use of the full height of the engine room to the next deck head. Reduction in the volumetric flow rate and temperature by cooling in the scrubber may permits the funnel structure of the ship to be made smaller than otherwise. The elimination or reduction of hot gas plumes may also reduce the thermal radiation signature of ships having suitable scrubbers, and may reduce the hazard of exhaust interference with operation of aircraft from those ships.

As noted above, access ports 158 permit installation and removal of the central reaction segment 48. All of the internal and external components illustrated in FIGS. 2 through 4 can be constructed of mild steel, but in the preferred embodiment are made from stainless steel. Other materials, such as may aluminum, or plastic materials, can be used depending on the temperature and corrosion environment of specific applications.

The housings of scrubber 30 have all necessary connections for supplying fresh and/or recycled scrubbing solution; connections for supplying internal or external heat exchange devices; control and monitoring devices for scrubbing solution flow rates, temperature, pressure, gas flow rates; and for controlling and monitoring the optional heat exchange device.

As described, the preferred embodiment provides a means to produce turbulent mixing of the scrubbing solution to constantly re-circulate scrubbing solution for reaction within the gas phase to liquid phase contact zone and to provide a turbulent region of bubble to bubble coalescence. It also provides an arrangement of vortex slots which encourage an increase in gas retention time, a reduction in bubble size, which both allow for increased bubble surface area and immersion time of the gas bubbles within the reaction zone of the scrubber.

Although the slots used in the preferred embodiment are ⅛ inch wide, slots of a different thickness could also be used depending on the resultant Reynolds number of the emerging gas stream. Sizes in the range of 1/32" to ¼ could be used. Decrease in slot width tends to increase the complexity and cost of manufacture. Decreasing the overall slot area of the entire slot array, whether the number of slots is too few or the width of the slots too narrow, will tend to increase the local velocities through the slots, and also the pressure drop across them. The geometry chosen should be suited to the sensitivity of the engine to exhaust system back pressure. Although the preferred flowrate is 200 SCFM, a single reactor cell can be used over a range of flow rates between 100 and 500 cubic feet per minute at standard temperature and pressure (68.0 F and 760 mm Hg).

The shape of the slots need not be rectangular, although rectangular slots are relatively easy to manufacture. For example, the pipe wall at the end of pipe 58 could be perforated by an array of round holes, like a colander, with the holes drilled at the desired angle. Alternatively, oval or elliptical slots could be used, or some other arbitrary shape, such as a hex, a star, or a cross. In the preferred embodiment the slots are straight, leaving fingers 112 between them that have straight, parallel sides, oriented vertically with respect to bath 68. As described the array of slots extends over a range between a first depth, corresponding to the depth of the uppermost extremity of slots 64 and a second depth, greater than the first, such that as gas flow increases a larger cross-sectional porting area will be exposed and used for gas transmission.

Slots 64 could be tapered, could have a zig-zag, helical, or sinusoidal profile, or other shape found suitable. Furthermore, slots 64 need not be of constant width, but could, for example be formed to narrow in the manner of a convergent nozzle. The slots need not be straight, but could be bent, with an inlet angle inside pipe 58 being different from the outlet angle. Note also, that while slots 76 of the secondary bubble and vortex generator are the same shape and size as, but opposite hand to, slots 64, it is not necessary that this be so. Slots of different shapes or sizes could be used as found suitable to produce a desired Reynolds number or heat or mass transfer relationship analogous to a Nusselt number. A mesh or grillwork with openings of suitable size, shape and angle could also be used.

As noted above, in the preferred embodiment there are 36 slots 64, made at an angle of 60 degrees from the local normal of the wall at the slot exit. Other angles in the 0 to 75 degree range could be used, particularly in the 30 degree to 70 degree range. However the inventors prefer 60 degrees for the concentric, round geometry of the preferred embodiment. Similarly, there are 48 of slots 76, also inclined at 60 degrees, but in the opposite direction.

Figure 9:
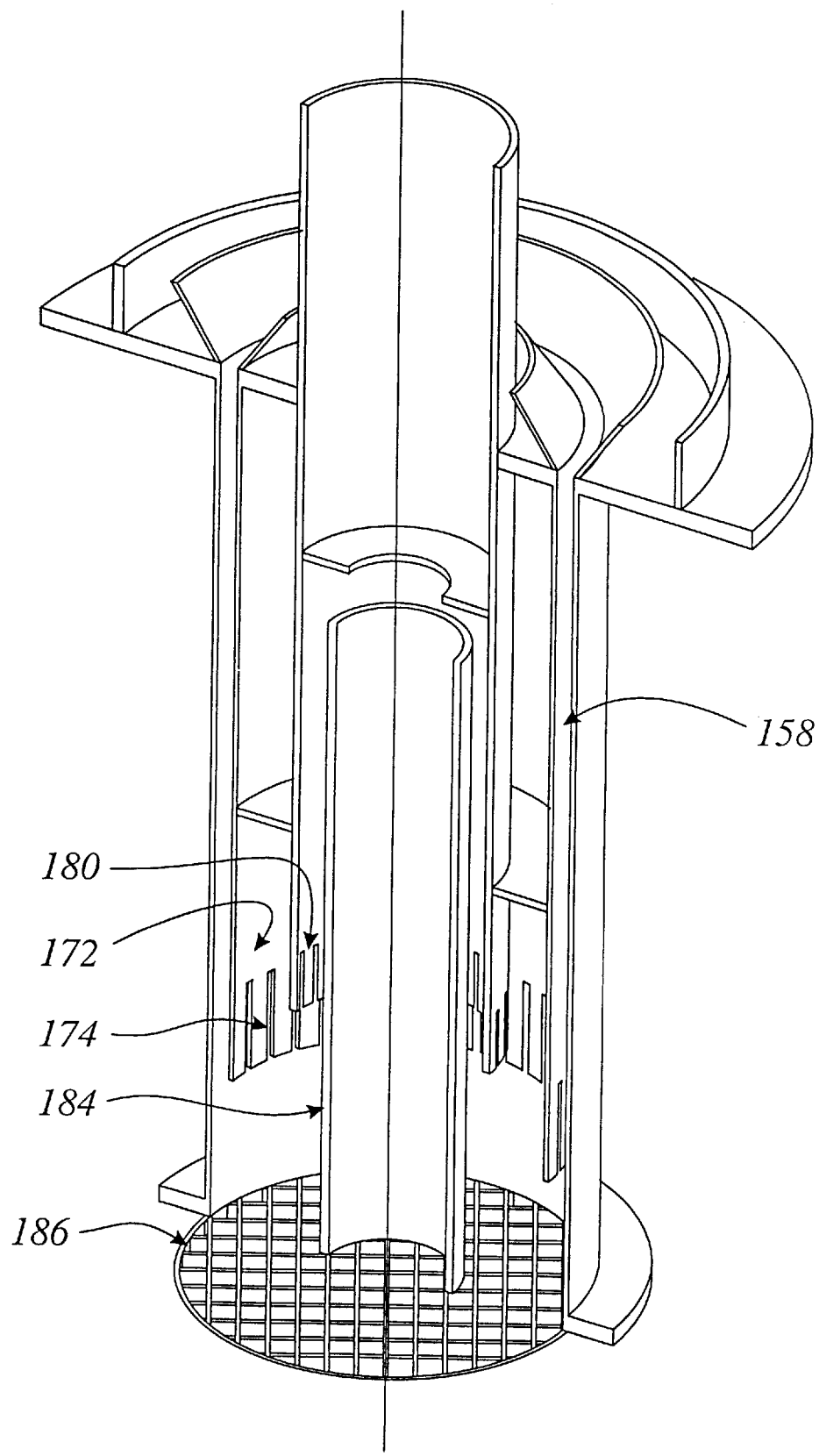
FIG. 9 is a general arrangement, isometric view of an alternative conduit detail for an reaction cell analogous to the reaction cell of FIG. 3.
Figure 10:
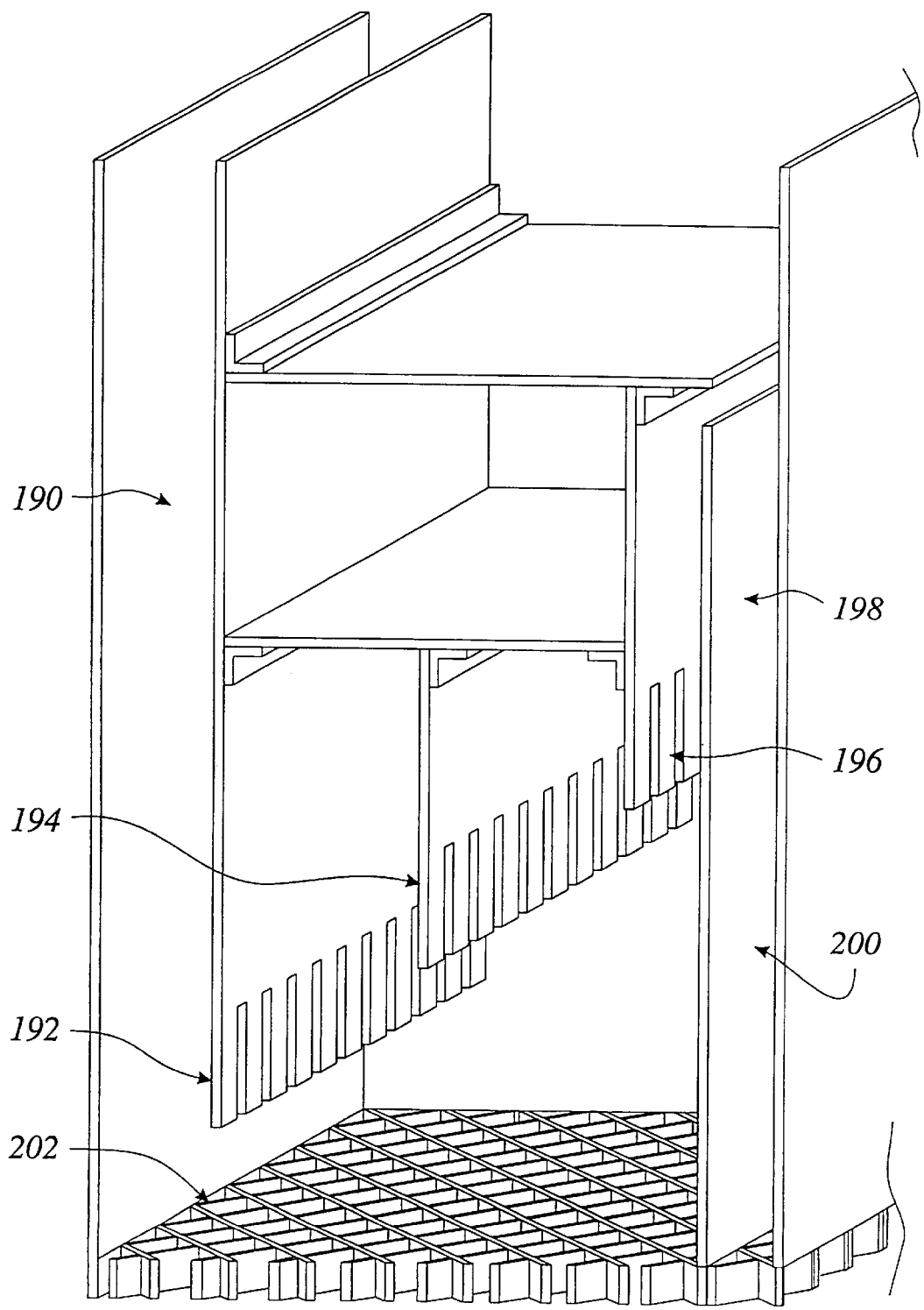
FIG. 10 is a general arrangement, isometric view of an alternative conduit detail for an reaction cell analogous to the reaction cell of FIG. 3.

As shown in the embodiment of FIG. 9, an alternative embodiment of down coner pipe 158 is formed with an inwardly facing wall 172 provided with angled slots 174, which feeds a second, counter-angled vortex generator 180, which surrounds curtain wall 182, and a central settling, column 184. A vortex breaker matrix 186, underlines the reaction zone to encourage settling into bottom settling tank 50. Similarly, an alternative rectangular, or square embodiment can be made as shown in FIG. 10 in which down coner pipe 190 is rectangular, and has a weir 192 along one side with slots, followed by another weir 194 with slots, followed by yet another weir 196 with slots in a three stage device, finally having a curtain wall 198 yielding a settling column 200. A vortex breaker matrix is indicated as 202.

It follows from the foregoing that down-coner pipe 58 need not be a circular cylinder. Subject to the ability to produce the desired size of bubbles and an adequate degree of turbulent mixing, it could be oval, elliptical, square, rectangular, polygonal, star shaped, kidney shaped, or some other shape permitting suitable flow and mixing behaviour to be achieved. Notwithstanding these possible alternatives, the embodiment of FIGS. 2 through 8 is preferred.

Similarly, while down corner pipe 58 is shown, in the preferred embodiment as being mounted vertically relative to bath 68, this need not be the case. Pipe 58 could be disposed at an angle somewhat offset from the vertical, and pipe 58 need not be straight, but could be curved, or dog-legged, or spiral. The straight, vertical, round cylindrical shape of the present embodiment is preferred because of the ready availability of round pipe, and the relative ease of manufacture.

As shown, down corner pipe 58 has an upper portion which has weir 106 mounted to it an a lower portion that includes discharge end 60. The two portions are joined at a flange below breaker plate 84. Pipe 58 could be fabricated as a straight through pipe without this joint.

In other alternative embodiments, it is possible to make a scrubber of the same general nature as the preferred embodiment, that has only a single set of flow splitting slots or apertures. It is also possible to make a similar device having three or more sets of flow splitting apertures, any one or more of which can be formed to act as vortex generators. The number of cascades of vortex generators, and their specific geometry, depends on the efficiency of particulate removal desired, the physical equipment space available, and the permissible back pressure.

The use of seawater as a scrubbing fluid, rather than fresh water, permits incidental removal of nitrous oxide due to its reaction with sulfates in the seawater. The concentration of sulfates in seawater is relatively weak, in the range of a 2 to 5% solution. If the solution were stronger a higher percentage of nitrous oxide would be removed.

Alternative embodiments of scrubbers can be made that do not employ a flow of fluid down the wall of the down corner pipe. If fluid is desired, it can be sprayed onto the walls, or aspirated into the gas stream in droplet form by use of an aspirating nozzle.

Breaker plate 84 could be an imperforate, monolithic plate forcing all gas flow through annular gap 88, or it could have either a large number of communicating holes, or could be removed entirely. It could be in the form of a mesh, or grillwork. The breaker plate shown is preferred given its simplicity of construction.

Figure 11:
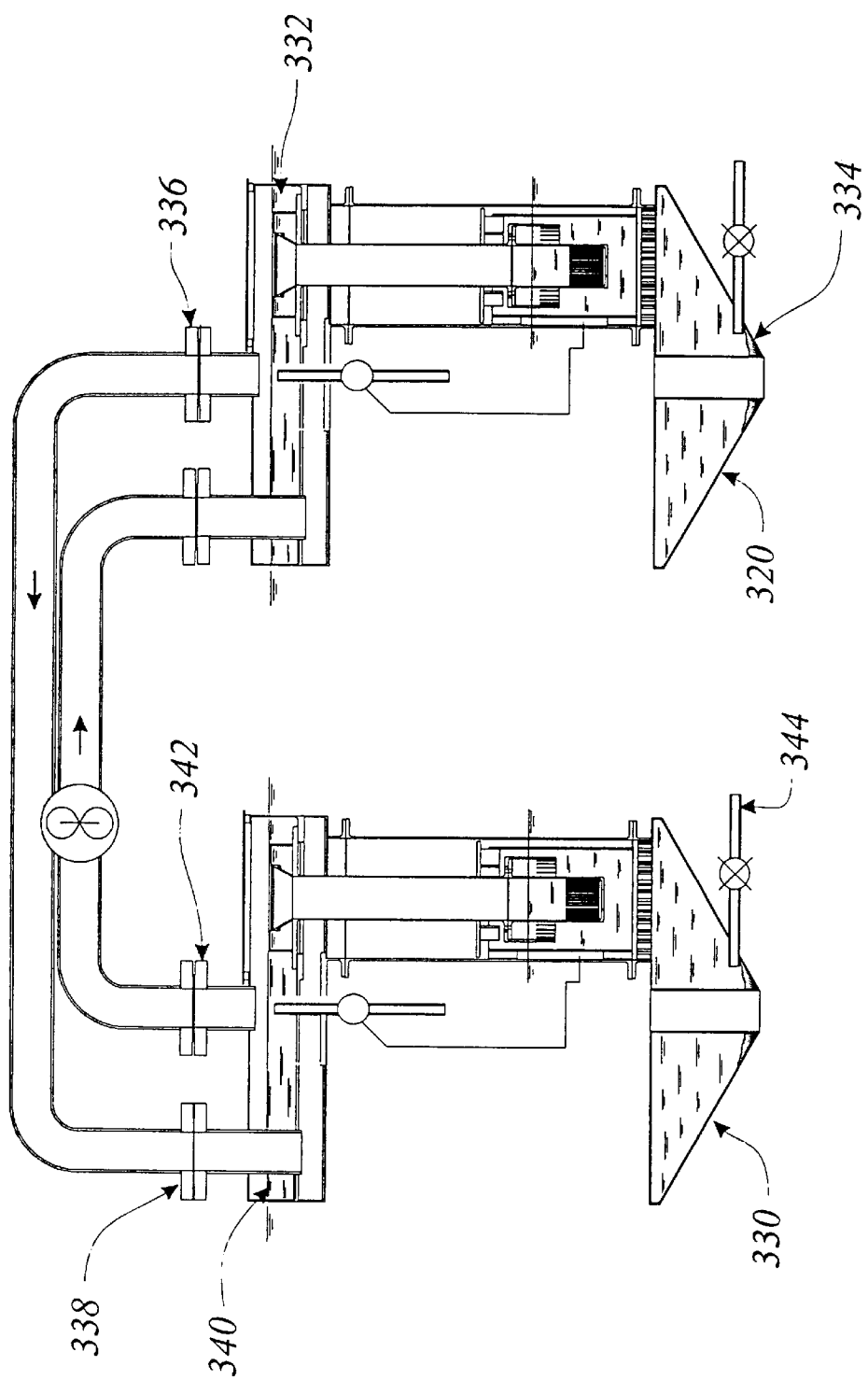
FIG. 11 is a general arrangement drawing of a pair of scrubber systems as shown in FIG. 3 linked to operated in a cascade.

In another embodiment, as indicated in FIG. 11 for treating contaminated liquid waste, two scrubber units 320 and 330 are mounted together in a closed loop configuration. The gas loop is closed and the gas employed is, nominally, clean air. In the instance of scrubber unit 320, the scrubbing medium is not the liquid, but the gas. The liquid to be scrubbed is wastewater laced with ammonia from a municipal or industrial waste landfill site. At the upper reservoir 332 of scrubber 320, the inlet temperature of the liquid is 55 C, and the Ph of the liquid is maintained at a value in the range of 10.5 to 13, typically 12, by the addition of ammonium hydroxide. After processing, the liquid that settles to the bottom of the settling tank 334 is water with 4% of the ammonia remaining, which can be discharged safely. The gas taken off at the outlet 336 is air and ammonia. This mixture is fed into the inlet 338 of unit 330.

In scrubber 330 the liquid fed into upper reservoir 340 is water plus the stoichiometric requirement of sulfuric acid to absorb the gaseous ammonia in the outlet gases from scrubber 320. The operation of scrubber 320 is generally as described above, with the exception that the mixing scrubbing process occurs at 55 C. The resultant output is nominally clean air at gas off take 342 and water with dissolved ammonium sulfate at outlet 344. The liquid can then be driven off to yield fertilizer, or the liquid can be sprayed as a fertilizing liquid.

A preferred embodiment has been described in detail and a number of alternatives have been considered. As changes in or additions to the above described embodiments may be made without departing from the nature, spirit or scope of the invention, the invention is not to be limited by or to those details, but only by the appended claims.

We claim:

1. A scrubber for scrubbing gases, comprising:
   a scrubbing vessel for containing a bath of scrubbing liquid, said vessel having a reaction zone, and a quiescent zone;
   a conduit having defined therein an intake for receiving gases to be scrubbed;
   said conduit having a first wall and outlet porting defined therein, said porting defined in said wall for immersion in a scrubbing medium, said conduit defining a passage through which gases can be transported from said intake to said outlet porting, said porting including a first array of slots defined in said first wall;
   said conduit being mounted to said vessel to present said porting in an immersed position relative to the scrubbing liquid in said reaction zone, whereby gases exiting said porting can mix with said scrubbing liquid in said reaction zone;
   a partition having said reaction zone lying to one side thereof, said partition being a second wall bounding a settling column, said partition having an upper edge over which scrubbing liquid can drain into said settling column and circulate back to said bath;
   a third wall intermediate said first wall and said second wall, said third wall having a second array of slots defined therein;
   when said conduit is immersed in said scrubbing medium, said porting being submerged and extending between a first depth and a second depth;
   a turbidity interrupter located between said quiescent zone and said reaction zone, said turbidity interrupter being a barrier having channels therein, said channels communicating between said quiescent zone and said reaction zone; and
   said slots of said first array of slots being separated from one another by fingers, said fingers encouraging formation of more than one stream of bubbles through said porting.

2. The scrubber of claim 1 wherein said fingers have parallel sides, and said slots are angled through said wall in a direction having a component normal to said first wall and a component tangential to said first wall and perpendicular to said parallel sides of said fingers.

3. The scrubber of claim 1 wherein said porting presents a greater flow area as the head of the gases increases.

4. The scrubber of claim 1 wherein said conduit has an effective cross sectional flow area, and said porting has an effective cross-sectional flow area, and the effective cross sectional flow area of said porting is less than the effective cross-sectional flow area of said conduit.

5. The scrubber of claim 1 wherein said slots of said first array of slots have a width in the range of $\frac{1}{32}$ to $\frac{1}{4}$ inches.

6. The scrubber of claim 1 wherein said conduit is a cylindrical pipe having a longitudinal axis, said first wall is a cylindrical wall of said pipe, and said slots of said first array of slots are let through said pipe wall at an angle to release the gases to be scrubbed into the scrubbing medium in a direction having a component normal to said pipe wall and a component tangential to said pipe wall and perpendicular to said axis.

7. A scrubber for scrubbing gases, comprising:
- a scrubbing vessel for containing a bath of scrubbing liquid, said vessel having a reaction zone, and a quiescent zone;
- a conduit having defined therein an intake for receiving gases to be scrubbed, said conduit having a conduit wall and outlet porting defined therein, said conduit defining a passage through which gases can be transported from said intake to said outlet porting;
- said conduit being mounted to said vessel to present said porting in an immersed position relative to the scrubbing liquid in said reaction zone, whereby gases exiting said porting can mix with said scrubbing liquid in said reaction zone;
- a partition having said reaction zone lying to one side thereof, said partition being a wall bounding a settling column, said partition having an upper edge over which scrubbing liquid can drain into said settling column and circulate back to said bath;
- a turbidity interrupter located between said quiescent zone and said reaction zone, said turbidity interrupter being in the nature of a barrier having channels therein, said channels communicating between said quiescent zone and said reaction zone.

8. The scrubber of claim 7 wherein said reaction zone lies above said turbidity interrupter.

9. The scrubber of claim 8 wherein said turbidity interrupter is a plate having vertical honeycomb channels therein.

10. The scrubber of claim 7 wherein said porting includes an array of separated fingers having gas flow apertures defined therebetween.

11. The scrubber of claim 7 wherein said porting extends between a first depth and a second depth, and said porting is let through said wall at an angle to promote turbulence in said reaction zone.

12. The scrubber of claim 7 wherein said conduit extends in a longitudinal direction, said longitudinal direction having a vertical component relative to the scrubbing medium, said wall includes an array of separated fingers, said porting including an array of slots defined between said fingers, said slots being let through said wall in a direction having a component normal to said wall and another component horizontally tangential to said wall.

13. The scrubber of claim 12 wherein said slots are angled at an angle in the range of 100 to 75° relative to said component normal to said wall.

14. The scrubber of claim 7 wherein said conduit wall has an array of vertically extending parallel sided fingers, said porting is an array of slots defined between said parallel sided fingers, and said slots have a width that is in the range of 1/32 to 1/4 inches.

15. The scrubber of claim 7 further comprising a scrubbing fluid supply system mounted to introduce a flow of scrubbing medium within said conduit.

16. The scrubber of claim 7 wherein said intake is mounted amidst a scrubbing fluid reservoir, said conduit wall has an inside surface, and said intake has a weir mounted to permit scrubbing fluid from the reservoir to flow along said inside surface of said conduit wall.

17. The scrubber of claim 7 wherein said scrubber has a secondary scrubber stage mounted to intercept gases emanating from said porting and said secondary scrubber stage has turbulence generators mounted to lie immersed in the scrubbing medium.

18. The scrubber of claim 17 wherein said secondary scrubber stage has a trap for the gases, said porting is let through said conduit wall at an angle to impart momentum to said gases, said momentum having a component horizontally tangential to said conduit wall, and said turbulence generators of said secondary scrubber stage are let through said trap at an angle to impart a component of momentum to gases exiting therefrom that is opposed to the horizontally tangential component of said gases exiting said porting of said conduit wall.

19. The scrubber of claim 7 wherein said scrubber includes a baffle in the nature of a breaker plate mounted above said reaction zone, a gap being defined between said breaker plate and said upper edge of said wall.

20. A method for passing a gas through a liquid said method comprising:
- providing a gas conduit for transporting the gas from an inlet to a bath of said liquid, said gas conduit having a conduit wall, said bath having a reaction zone and a quiescent zone separated from said reaction zone by a turbidity interrupter in the nature of a barrier having channels formed therein for conducting liquid between said reaction zone and said quiescent zone;
- providing porting in said conduit wall, and submerging said porting in said reaction zone of said bath;
- forcing the gas through said submerged porting to form bubbles in said liquid;
- providing a breaker plate above said reaction zone to encourage the breaking of the bubbles;
- permitting liquid and gas to leave said reaction zone by flowing between said breaker plate and an upper edge of a partition wall;
- permitting said liquid to drain into a settling column separated from said reaction zone by said partition wall; and
- settling said liquid in a quiescent zone to permit bubbles and solids entrained in the liquid to separate out gravimetrically.

21. The method of claim 20 wherein said step of forcing includes the step of directing the gas into the liquid at an angle.

22. The method of claim 20 wherein the porting includes an array of vertical slots defined in the wall of the conduit, and said step of forcing includes compelling the gas to move through said slots into said reaction zone.

23. The method of claim 22 wherein said method includes the step of passing said gas through a second slotted wall.

24. The method of claim 22 wherein said step of settling includes passing said liquid through a vorticity breaker.

* * * * *